United States Patent
Yuan et al.

(10) Patent No.: US 6,765,452 B2
(45) Date of Patent: Jul. 20, 2004

(54) METHOD AND APPARATUS FOR DAMPING AN LC FILTER

(75) Inventors: Xiaoming Yuan, Shanghai (CN); Fei Wang, Blacksburg, VA (US); Richard S. Zhang, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 28 days.

(21) Appl. No.: 10/212,390

(22) Filed: Aug. 6, 2002

(65) Prior Publication Data

US 2004/0027208 A1 Feb. 12, 2004

(51) Int. Cl.[7] ............................................. H03G 11/04
(52) U.S. Cl. .................... 333/17.1; 333/174; 363/37; 363/40; 363/44
(58) Field of Search .............................. 333/17.1, 174; 363/37, 40, 44

(56) References Cited

U.S. PATENT DOCUMENTS

| | | | | |
|---|---|---|---|---|
| 5,132,894 A | * | 7/1992 | Rozman et al. | 363/51 |
| 5,526,252 A | * | 6/1996 | Erdman | 363/41 |
| 5,606,289 A | * | 2/1997 | Williamson | 330/297 |
| 5,691,626 A | * | 11/1997 | Esser et al. | 323/205 |
| 6,166,929 A | * | 12/2000 | Ma et al. | 363/37 |
| 6,196,345 B1 | * | 3/2001 | Lyons et al. | 180/65.8 |

OTHER PUBLICATIONS

V. Blasko, et al "A Novel Control to Actively Damp Resonance in Input LC Filter of a Three Phase Voltage Source Converter", 1996 IEEE, PP 545–551.
Y. Sato, et al "A Current–Type PWM Rectifier with Active Damping Function", IEEE Trans on Industry Applications, vol. 32, No. 3, May /Jun. 1996, pp. 533–541.

* cited by examiner

Primary Examiner—Michael Tokar
Assistant Examiner—Khai M. Nguyen
(74) Attorney, Agent, or Firm—Ann M. Agosti; Patrick K. Patnode

(57) ABSTRACT

A method for damping an LC filter coupled to a converter and generating a filter signal. The method comprises sensing the filter signal and processing the filter signal to generate a corresponding feedback signal. The feedback signal is subtracted from a controller signal to generate a difference signal. The difference signal is used for damping the LC filter.

44 Claims, 4 Drawing Sheets

METHOD AND APPARATUS FOR DAMPING AN LC FILTER

BACKGROUND

The present invention relates generally to filters, and more specifically to a method and apparatus for active damping of LC filters.

Power electronic systems such as converters are typically used to supply power to various loads. It is desirable that the voltage or current supplied to such loads is purely sinusoidal. To obtain sinusoidal waveforms, most power electronic systems use filters. For example, in a uninterrupted power supply (UPS) system, a second order filter is typically used in conjunction with a three phase inverter to supply sinusoidal voltage or current to the load.

Filters are usually implemented using inductors and capacitors. One of the important characteristics of an LC filter is resonance. Resonance is defined as the condition that exists when the inductive reactance and the capacitive reactance of the LC filter are of equal magnitude and the corresponding frequency is known as resonant frequency. Mathematically, resonant frequency equals:

$$fr = \frac{\pi}{2\sqrt{LC}}$$

wherein L is the value of the inductor, C is the value of the capacitor and fr is the resonant frequency. At resonant frequency, the impedance of the filter is minimal which in turn causes an undesirably large voltage to be delivered to the load. To prevent such large voltages from being delivered to a load, the filters are usually damped.

One common method by which a filter can be damped is by coupling a resistance in series or parallel with the inductor or capacitor. A problem with this solution is that undesirably large amounts of power are lost during normal filter operations. Additionally, the filter circuit becomes more bulky because the resistor typically consumes significant space.

An alternative method to damp filters is to reduce the gain in a controller which is usually present within the power electronics system. In this method, the overall speed of the system can be reduced.

Therefore, what is desired is a method and apparatus for damping filters while minimizing power and speed losses.

BRIEF DESCRIPTION

Briefly, in accordance with one embodiment of the invention, a method for damping an LC filter coupled to a converter comprises sensing a filter signal of the LC filter and processing the filter signal to generate a corresponding feedback signal. The feedback signal is subtracted from a controller signal to generate a difference signal. The difference signal is used for damping the LC filter.

Another aspect of the invention provides a damping device for damping an LC filter coupled to a converter. The damping device comprises a feedback block configured for processing a filter signal from the LC filter for generating a feedback signal. The damping device also comprises a subtractor configured for using the feedback signal and a controller signal for generating a difference signal. The difference signal is used for damping the LC filter.

Another aspect of the invention provides a system for damping an LC filter. The system is coupled to a converter and comprises means for obtaining a filter signal from the LC filter and means for processing the filter signal to generate a corresponding feedback signal. The system further comprises means for subtracting the feedback signal from a controller signal to generate a difference signal and means for using the difference signal for damping the LC filter.

Another aspect of the invention provides a computer-readable medium storing computer instructions for instructing a computer system to formulate a control signal for damping an LC filter. The computer instructions include obtaining a filter signal of the LC filter and processing the filter signal to generate a corresponding feedback signal. The computer instructions further include subtracting the feedback signal from a controller signal to generate a difference signal and using the difference signal to generate the control signal for damping the LC filter.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
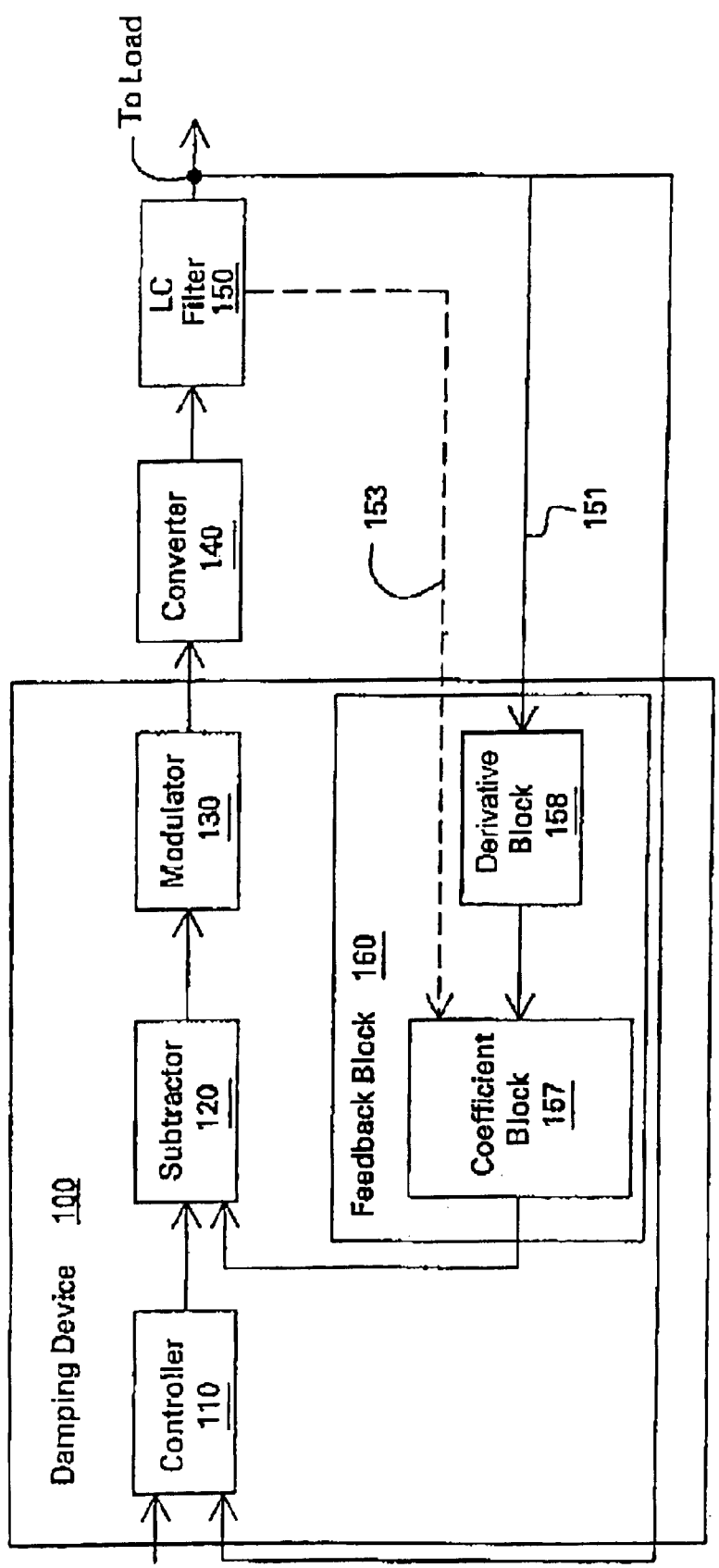
FIG. 1 is a block diagram of a system for damping an LC filter.

FIG. 1 is a block diagram of a system in which an LC filter is damped according to an aspect of the invention. FIG. 1 is shown comprising damping device 100, converter 140 and LC filter 150. Damping device 100 is coupled to converter 140. Converter 140 is coupled to LC filter 150 which in turn generates a filter signal. In one embodiment, the filter signal comprises an output signal 151 of the LC filter. In a more specific embodiment the output signal is expressed and controlled as an output voltage. In another embodiment, the filter signal comprises a capacitor current signal 153 of the LC filter. The output signal generated by LC filter 150 is used to drive a load (not shown) coupled to the LC filter. Damping device 100 is used for damping LC filter 140. Damping device 100 comprises controller block 110, subtractor 120, modulator 130 and feedback block 160. Each component is described in further detail below.

Feedback block 160 processes the filter signal generated by LC filter 150 to generate a corresponding feedback signal. Feedback block 160 is shown comprising coefficient block 157 and derivative block 158. In the embodiment where the filter signal comprises an output signal, the output signal is first passed through the derivative block. The derivative block is configured for performing a derivative operation on the output signal to generate a derivative, which is then provided to coefficient block 157.

Coefficient block 157 is configured for obtaining a desired damping factor for LC filter. In one embodiment, the coefficient of the derivative operation is varied to obtained the desired damping factor of the LC filter. More specifically, in the embodiment where the feedback signal comprises the output signal, the mathematical equation of the coefficient of the derivative and the damping factor can be represented as shown below:

$$\xi = \frac{1}{2}\sqrt{\frac{L}{C}}\left(\frac{1}{R} + \frac{K_{PWM}d}{L}\right) \quad \text{Equation (1}$$

wherein $\xi$ represents the desired damping factor, d represents the coefficient, L represents an inductor value of the LC filter, C represents a capacitor value of the LC filter; R represents an equivalent resistance of a load coupled to the output of the LC filter, and $K_{PWM}$ represents a gain of converter 140. In this output signal embodiment, the coefficient is multiplied with the derivative of the output signal to generate the feedback signal.

In the embodiment where filter signal comprises capacitor current signal 153, the capacitor current is directly provided to the coefficient block (as indicated by the hashed lines). Coefficient block 157 is configured for varying the coefficient according to the mathematical equation below:

$$\xi = \frac{1}{2}\sqrt{\frac{L}{C}}\left(\frac{1}{R} + \frac{K_{PWM}Cd'}{L}\right)$$

wherein $\xi$ represents the desired damping factor, d' represents the coefficient, L represents an inductor value of the LC filter, C represents a capacitor value of the LC filter; R represents an equivalent resistance of a load coupled to the output of the LC filter, and KPWM represents a gain of converter 140. In this embodiment, the coefficient is multiplied with the capacitor current to generate the feedback signal.

Subtractor 120 receives the feedback signal and a controller signal. Controller 110 is configured for generating the controller signal. Controller 110 receives the output signal generated by LC filter 150 and a command signal. The command signal typically corresponds to the desired voltage of the output signal of the LC filter. In one example, the command voltage corresponds to output voltage of about 220 volts. Controller block generates a controller signal such that the output signal follows the command signal. The controller signal is typically obtained by performing various operations such as partial integration and amplification, for example, on a signal corresponding to the difference between the command signal and the output signal.

Continuing with subtractor 120, subtractor 120 is configured for using the feedback signal and the controller signal to generate a difference signal. The difference signal is provided to modulator 130.

The modulator is configured for modulating the difference signal with a desired switching frequency to generate a corresponding gating signal for converter 140. In one example, the desired switching frequency equals the switching frequency of converter 140. In one embodiment, the switching frequency of the converter is about 4 KHz. The gating signal thus generated by converter 140 is used for damping the LC filter.

In one embodiment, the converter comprises a voltage source inverter configured for converting a dc voltage using the gating signal generated by the modulator. The voltage source inverter generates a series of pulses which are provided to LC filter 140. The dc voltage of the voltage source inverter can be set to a desired voltage. In one example, the desired voltage is set to 800 volts.

LC filter 150 is configured for generating a sinusoidal output signal from the series of pulses obtained from converter 140. In one example, LC filter 150 is implemented using an inductor having a value of about 200 uH and a capacitor having a value of about 500 uF. The output signal is then provided to a load (not shown) coupled to the LC filter.

Using embodiments of the present invention, the use of passive components such as resistors can thus be avoided while maintaining the speed of the system.

Figure 2:
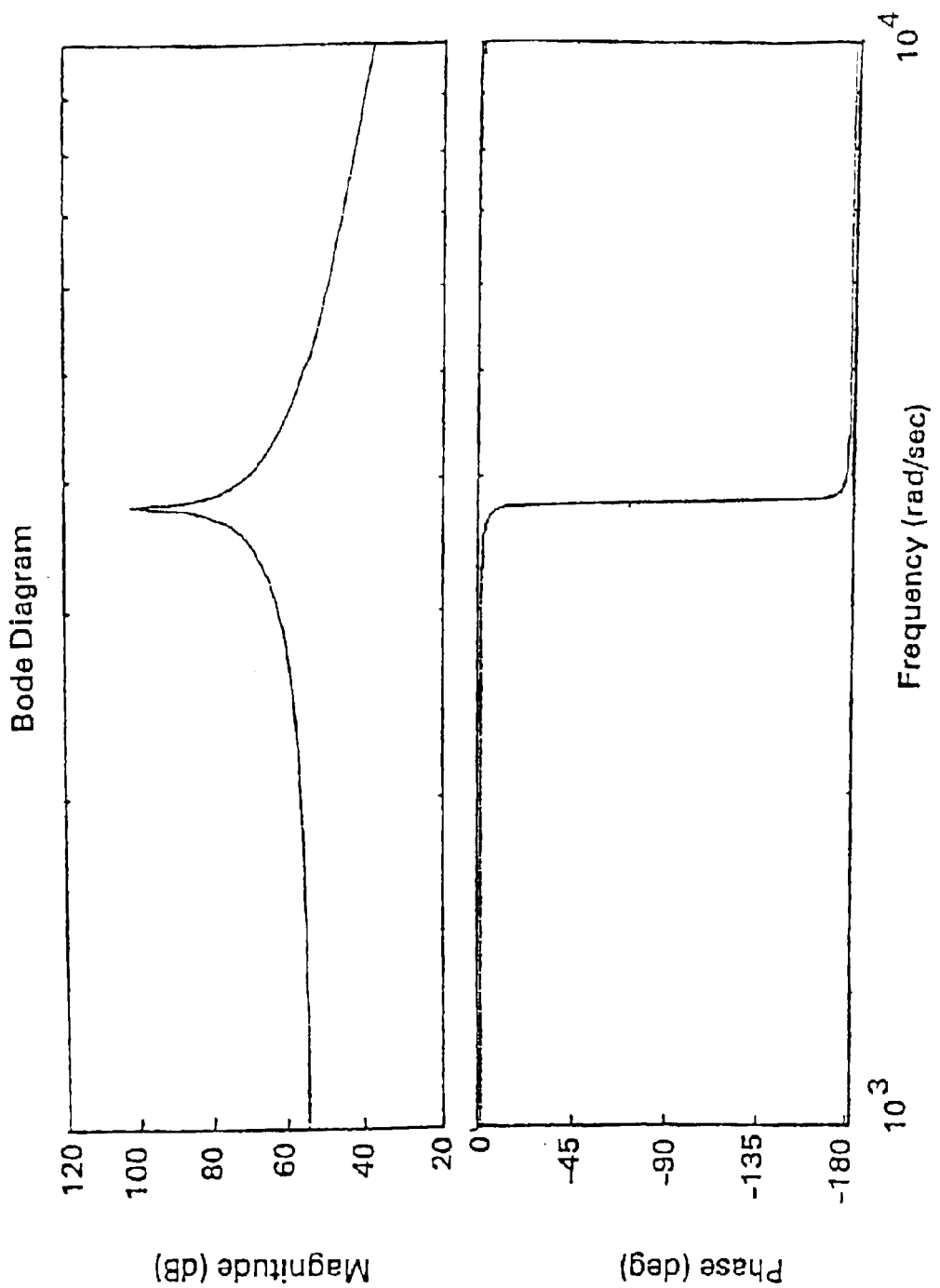
FIG. 2 is a graphical representation of the frequency response of an LC filter that is not damped.
Figure 3:
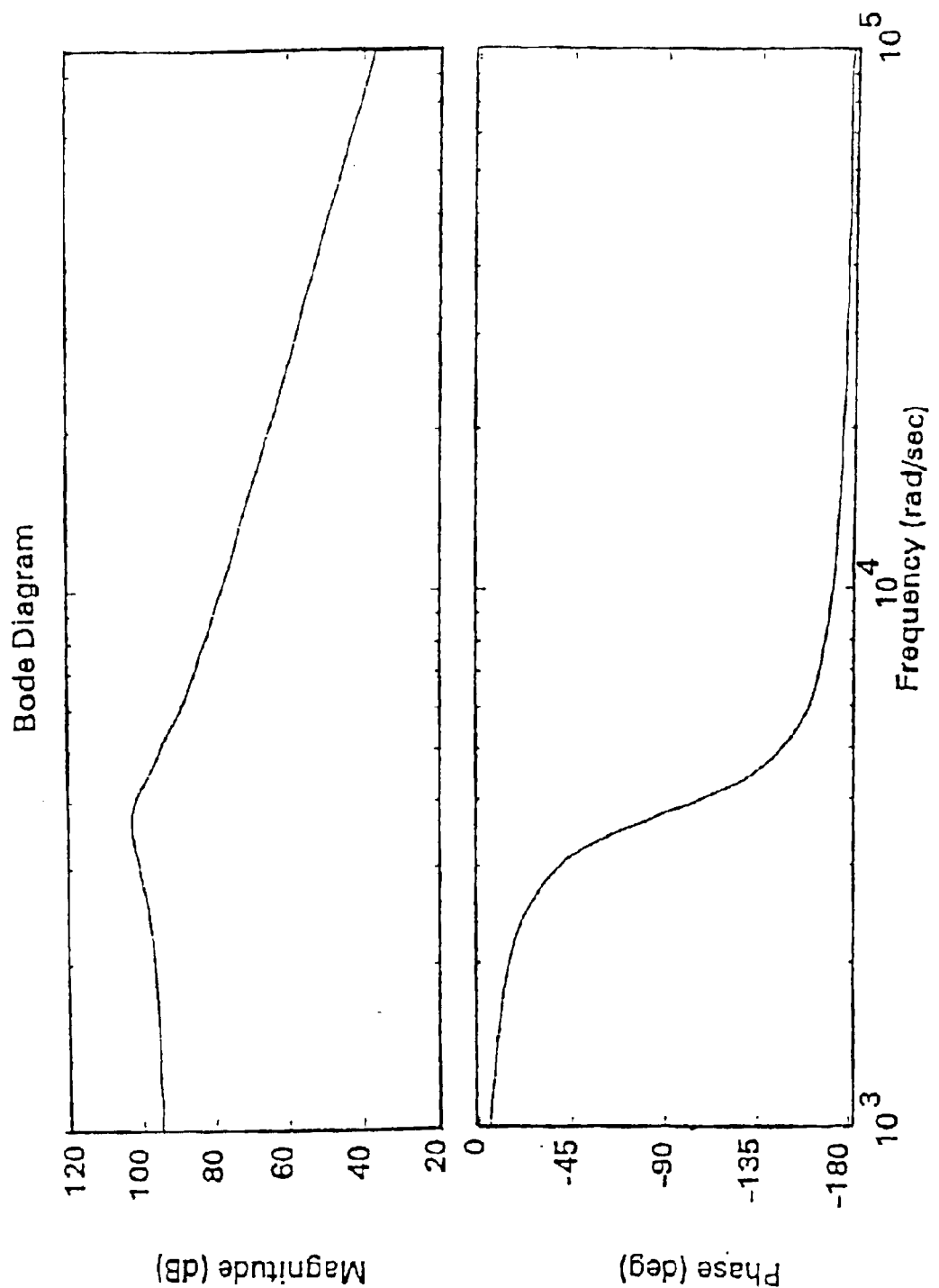
FIG. 3 is a graphical representation of the frequency response of an LC filter implemented in accordance with the invention.

The difference in the output signals, that is, output voltages provided by a conventional LC filter and an LC filter implemented according to the present invention is illustrated in FIG. 2 and FIG. 3. FIG. 2 and FIG. 3 represent simulated frequency responses of a LC filter not damped and an LC filter damped according to one embodiment of the invention respectively.

FIG. 2 is a graphical representation of the frequency response of a LC filter that is not damped. At a frequency corresponding to about 4 k rad/s, the corresponding gain is about 100 dB as opposed to a gain between 40–60 dB at all other frequencies. On the other hand, FIG. 3 is a graphical representation of the frequency response of an LC filter implemented in accordance with one embodiment the invention. For the same frequency, that is about 4 k rad/s, the corresponding output voltage remains between 40 and 60 dB.

Figure 4:
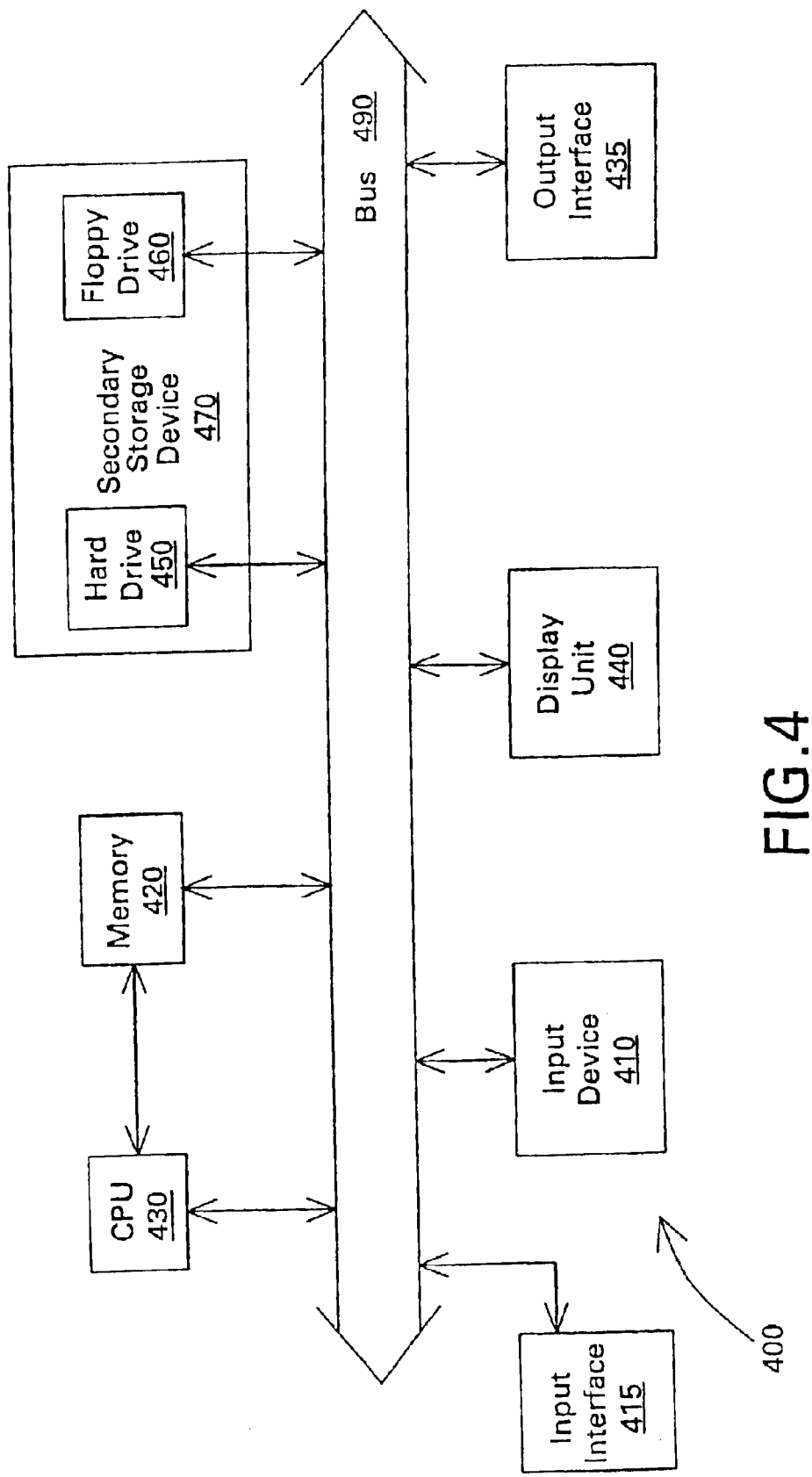
FIG. 4 is a block diagram illustrating the details of a general computer system in which the invention can be substantially implemented using software.

It may be appreciated that the invention can be substantially implemented using software. FIG. 4 is a block diagram illustrating the details of a computer system implemented in accordance with one embodiment of the present invention. Computer system 400 is shown comprising input device 410, input interface 415, memory 420, central processing unit (CPU) 430, output interface 435, display unit 440 and secondary storage device 470. All the components of computer system 400 communicate over bus 490, which can in reality include several physical buses connected by appropriate interfaces.

Input device 410 receives the filter signal generated by LC filter 150 through input interface 415. In one embodiment, the filter signal comprises an output signal generated by the LC filter. In an alternative embodiment, the filter signal comprises a capacitor current signal of said LC filter.

Input interface 415 processes the output signal to provide compatibility for the input device.

Memory 420 stores data representing command voltage, desired switching frequency, desired damping factor. CPU 430 executes the commands stored in memory 420 to generate a control signal that is used for damping the LC filter. The control signal is provided to the LC filter through the output interface 435. Display unit 440 can be used to display various signals and values such as the output signal, the damping factor of the LC Filter, switching frequency of the converter.

Secondary storage device 470 comprises storage components such as hard-drive 450 or removable drives (e.g., floppy-drive 460). Secondary storage device 470 can be used to store commands and/or data which enable computer system 400 to operate in accordance with the invention. By executing the stored commands, CPU 430 provides the electrical and control signals to coordinate and control the operation of various components in damping device 100.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for damping an LC filter coupled to a converter, said method comprising:
   (i) sensing a filter signal;
   (ii) passing said filter signal through a derivative to generate a modified filter signal;
   (iii) processing said modified filter signal with a coefficient to generate a corresponding feedback signal;
   (iv) subtracting said feedback signal from a controller signal to generate a difference signal; and
   (v) using said difference signal for damping said LC filter.

2. The method of claim 1, wherein said filter signal comprises an output signal of said LC filter.

3. The method of claim 1 wherein said filter signal comprises a capacitor current signal of said LC filter.

4. The method of claim 1, wherein said processing comprises multiplying said filter signal with said coefficient.

5. The method of claim 1, further comprising varying said coefficient to obtain a desired damping factor for said LC filter.

6. A method for damping an LC filter coupled to a converter, said method comprising:
   (i) sensing a filter signal;
   (ii) passing said filter signal through a derivative to generate a modified filter signal;
   (iii) processing said modified filter signal with a coefficient to generate a corresponding feedback signal;
   (iv) subtracting said feedback signal from a controller signal to generate a difference signal; and
   (v) using said difference signal for damping said LC filter;
wherein varying said coefficient comprises varying said coefficient in accordance with the following equation, wherein said filter signal comprises said capacitor current signal:

$$\xi = \frac{1}{2}\sqrt{\frac{L}{C}}\left(\frac{1}{R} + \frac{K_{PWM}Cd'}{L}\right)$$

wherein $\xi$ represents said desired damping factor, d represents said coefficient, L represents an inductor value of said LC filter, C represents a capacitor value of said LC filter, R represents an equivalent resistance of a load coupled to the output of said LC filter, and KPWM represents a gain of said converter.

7. A method for damping an LC filter coupled to a converter, said method comprising:
   (i) sensing a filter signal;
   (ii) processing said filter signal with a coefficient to generate a corresponding feedback signal;
   (iii) subtracting said feedback signal from a controller signal to generate a difference signal; and
   (iv) using said difference signal for damping said LC filter;
wherein varying said coefficient comprises varying said coefficient in accordance with the following equation when said filter signal comprises an output signal at said LC filter:

$$\xi = \frac{1}{2}\sqrt{\frac{L}{C}}\left(\frac{1}{R} + \frac{K_{PWM}d}{L}\right)$$

wherein $\xi$ represents said desired damping factor, d represents said coefficient, L represents an inductor value of said LC filter, C represents a capacitor value of said LC filter; R represents an equivalent resistance of a load coupled to an output of said LC filter, and KPWM represents a gain of said converter.

8. The method of claim 7, further comprising generating said controller signal by using said output signal and a command signal; and
   wherein using said difference signal further comprises modulating said difference signal with a reference frequency to generate a corresponding gating signal.

9. The method of claim 8, wherein said generating comprises controlling said output signal to follow said command signal.

10. The method of claim 8, wherein said modulating comprises setting said reference frequency equal to a desired switching frequency of said converter.

11. The method of claim 8, wherein said converter comprises a voltage source inverter, and wherein using said difference signal further comprises using said voltage source inverter for converting a dc voltage using said gating signal to generate a series of pulses.

12. The method of claim 11, wherein using said difference signal further comprises providing said series of pulses to said LC filter.

13. A damping device for damping an LC filter coupled to a converter, said damping device comprising:
   (i) a feedback block configured for processing a filter signal from said LC filter to generate a feedback signal;
   wherein the feedback block further comprises a derivative block for passing said output signal through a derivative and a coefficient block for processing said filter signal with a coefficient to generate the feedback signal;
   (ii) a subtractor configured for using said feedback signal and a controller signal for generating a difference signal, said difference signal for use in damping said LC filter.

14. The damping device of claim 13, wherein said feedback block is configured for obtaining a desired damping factor.

15. The damping device of claim 13, wherein said filter signal comprises a capacitor current signal of said LC filter.

16. The damping device of claim 13, wherein said filter signal comprises an output signal of said LC filter.

17. The damping device of claim 16, further comprising:
   (i) a controller configured for using said output signal and a command signal to generate said controller signal;
   (ii) a modulator configured for modulating said difference signal with a reference frequency to generate a corresponding gating signal.

18. The damping device of claim 17, wherein said converter comprises a voltage source inverter, said voltage source inverter being configured for converting a dc voltage using said gating signal to generate a series of pulses, said dc voltage being set to a desired voltage.

19. The damping device of claim 18, wherein said LC filter is configured for receiving said series of pulses.

20. The damping device of claim 17, wherein said controller is configured for controlling said output signal to follow said command signal.

21. The damping device of claim 17, wherein said modulator is configured for setting said reference frequency to a desired switching frequency of said converter.

22. The damping device of claim 18, wherein said converter comprises a voltage source converter.

23. A system for damping an LC filter coupled to a converter, said system comprising:
 (i) means for obtaining a filter signal from said LC filter;
 (ii) means for passing the filter signal through a derivative;
 (iii) means for processing said filter signal to generate a corresponding feedback signal;
 (iv) means for subtracting said feedback signal from a controller signal to generate a difference signal; and
 (v) means for using said difference signal for damping said LC filter.

24. The system of claim 23, wherein said filter signal comprises an output signal of said LC filter.

25. The system of claim 24, further comprising:
 means for generating said controller signal by using said output signal and a command signal;
 wherein said means for using said difference signal further comprises moans for modulating said difference signal with a reference frequency to generate a corresponding gating signal.

26. The system of claim 25, wherein said means for generating comprises means for controlling said output signal to follow said command signal.

27. The system of claim 25, wherein said means for modulating comprises means for setting said reference frequency equal to a desired switching frequency of said converter.

28. The system of claim 23, wherein said filter signal comprises a capacitor current signal of said LC filter.

29. The system of claim 23, wherein said means for processing comprises means for multiplying said filter signal with said coefficient.

30. The system of claim 23, further comprising means for varying the coefficient of said filter signal to obtain a desired damping factor for said LC filter.

31. The system of claim 23, wherein said converter comprises a voltage source converter, said voltage source converter comprises means for converting a dc voltage using said gating signal to generate a series of pulses.

32. The system of claim 31, wherein said means for converting further comprises means for providing said series of pulses to said LC filter.

33. A system for damping an LC filter coupled to a converter, said system comprising:
 (i) means for obtaining a filter signal from said LC filter including means for varying the coefficient of said filter signal to obtain a desired damping factor for said LC filter;
 (ii) means for passing the filter signal through a derivative;
 (iii) means for processing said filter signal to generate a corresponding feedback signal;
 (iv) means for subtracting said feedback signal from a controller signal to generate a difference signal; and
 (v) means for using said difference signal for damping said LC filter,
wherein means for varying said coefficient comprises means for varying said coefficient in accordance with the following equation, wherein said filter signal comprises an output signal of said LC filter:

$$\xi = \frac{1}{2}\sqrt{\frac{L}{C}}\left(\frac{1}{R} + \frac{K_{PWM}d}{L}\right)$$

wherein $\xi$ represents said desired damping factor, d represents said coefficient, L represents an inductor value of said LC filter, C represents a capacitor value of said LC filter; R represents an equivalent resistance of a load coupled to an output of said LC filter, and KPWM represents again of said converter.

34. A system for damping an LC filter coupled to a converter, said system comprising:
 (i) means for obtaining a filter signal from said LC filter including means for varying the coefficient of said filter signal to obtain a desired damping factor for said LC filter;
 (ii) means for passing the filter signal through a derivative;
 (iii) means for processing said filter signal to generate a corresponding feedback signal;
 (iv) means for subtracting said feedback signal from a controller signal to generate a difference signal; and
 (v) means for using said difference signal for damping said LC filter,
wherein means for varying said coefficient comprises means for varying said coefficient in accordance with the following equation, wherein said filter signal comprises a capacitor current signal of said LC filter:

$$\xi = \frac{1}{2}\sqrt{\frac{L}{C}}\left(\frac{1}{R} + \frac{K_{PWM}Cd'}{L}\right)$$

wherein $\xi$ represents said desired damping factor, d represents said coefficient, L represents an inductor value of said LC filter, C represents a capacitor value of said LC filter, R represents an equivalent resistance of a load coupled to the output of said LC filter, and KPWM represents a gain of said converter.

35. A computer-readable medium storing computer instructions for instructing a computer system to formulate a control signal for damping an LC filter having a filter signal, the computer instructions including:
 (i) passing said filter signal through a derivative;
 (ii) processing said filter signal with a coefficient to generate a corresponding feedback signal;
 (iii) subtracting said feedback signal from a controller signal to generate a difference signal; and
 (iv) using said difference signal to generate said control signal for damping said LC filter.

36. The computer readable medium of claim 35, wherein said filter signal comprises an output signal of said LC filter.

37. The computer-readable medium of claim 36, wherein said instructions further comprise:
 (i) generating said controller signal by comparing said output signal to a command signal;
 (ii) modulating said difference signal with a reference frequency to generate a corresponding gating signal.

38. The computer-readable medium of claim 37, wherein said instructions further comprise generating comprises said controller signal by controlling said output signal to follow said command signal.

39. The computer-readable medium of claim 37, wherein said instructions further comprise modulating said difference signal by setting said reference frequency equal to a desired switching frequency of a converter.

40. The computer readable medium of claim 35, wherein said filter signal comprises a capacitor current signal of said LC filter.

41. The computer readable medium of claim 35, wherein said processing comprises multiplying said filter signal with said coefficient.

42. The computer-readable medium of claim 35, wherein said instructions further comprise varying the coefficient of said filter signal to obtain a desired damping factor for said LC filter.

43. A computer-readable medium storing computer instructions for instructing a computer system to formulate a control signal for damping an LC filter having a filter signal, the computer instructions including:
(i) passing said filter signal through a derivative;
(ii) processing said filter signal with a coefficient to generate a corresponding feedback signal;
(iii) subtracting said feedback signal from a controller signal to generate a difference signal; and
(iv) using said difference signal to generate said control signal for damping said LC filter, wherein said instructions further comprise valving said coefficient in accordance with the following equation, wherein said filter signal comprises an output signal of said LC filter:

$$\xi = \frac{1}{2}\sqrt{\frac{L}{C}}\left(\frac{1}{R} + \frac{K_{PWM}d}{L}\right)$$

wherein $\xi$ represents said desired damping factor, d represents said coefficient, L represents an inductor value of said LC filter, C represents a capacitor value of said LC filter; R represents an equivalent resistance of a load coupled to an output of said LC filter, and KPWM represents a gain of said converter.

44. A computer-readable medium storing computer instructions for instructing a computer system to formulate a control signal for damping an LC filter having a filter signal, the computer instructions including:
(i) processing said filter signal with a coefficient to generate a corresponding feedback signal;
(ii) subtracting said feedback signal from a controller signal to generate a difference signal; and
(iii) using said difference signal to generate said control signal for damping said LC filter, wherein said instructions further comprise varying said coefficient in accordance with the following equation, wherein said filter signal comprises a capacitor current signal of said LC filter:

$$\xi = \frac{1}{2}\sqrt{\frac{L}{C}}\left(\frac{1}{R} + \frac{K_{PWM}Cd'}{L}\right)$$

wherein $\xi$ represents said desired damping factor, d represents said coefficient, L represents an inductor value of said LC filter, C represents a capacitor value of said LC filter; R represents an equivalent resistance of a load coupled to the output of said LC filter, and KPWM represents a gain of said converter.

* * * * *